United States Patent
Ali

(10) Patent No.: US 9,856,745 B2
(45) Date of Patent: *Jan. 2, 2018

(54) ACOUSTIC TREATMENT IN AN UNDUCTED AREA OF A GEARED TURBOMACHINE

(75) Inventor: Amr Ali, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/406,712

(22) Filed: Feb. 28, 2012

(65) Prior Publication Data

US 2013/0223973 A1    Aug. 29, 2013

(51) Int. Cl.
| | |
|---|---|
| F01D 25/00 | (2006.01) |
| F02C 7/24 | (2006.01) |
| F02C 7/045 | (2006.01) |
| F02K 1/82 | (2006.01) |
| F02K 3/06 | (2006.01) |

(52) U.S. Cl.
CPC ............ F01D 25/00 (2013.01); F02C 7/045 (2013.01); F02C 7/24 (2013.01); F02K 1/827 (2013.01); F02K 3/06 (2013.01); F05D 2260/4031 (2013.01); Y02T 50/672 (2013.01)

(58) Field of Classification Search
CPC . F01D 25/00; F02K 1/827; F02K 3/06; F02C 7/24; F02C 7/045; F05D 2260/96
USPC .... 415/1, 119, 144, 145; 181/210, 213, 214, 181/288, 292; 60/226.1, 39.163, 268
See application file for complete search history.

(56) References Cited

U.S. PATENT DOCUMENTS

| | | | |
|---|---|---|---|
| 3,287,906 A | | 11/1966 | McCormick |
| 4,077,206 A | | 3/1978 | Ayyagari |
| 5,041,323 A | * | 8/1991 | Rose et al. .................... 181/292 |
| 5,251,435 A | | 10/1993 | Pauley |
| 5,782,082 A | * | 7/1998 | Hogeboom et al. ......... 60/226.1 |
| 5,915,917 A | | 6/1999 | Eveker et al. |
| 5,943,856 A | | 8/1999 | Lillibridge et al. |
| 6,051,302 A | | 4/2000 | Moore |
| 6,170,254 B1 | * | 1/2001 | Cariola ................. B64C 25/423 244/110 B |
| 6,182,787 B1 | | 2/2001 | Kraft et al. |
| 6,557,799 B1 | * | 5/2003 | Sternberger ........... B64D 33/04 244/1 N |
| 6,619,030 B1 | * | 9/2003 | Seda et al. .................... 60/226.1 |
| 7,337,875 B2 | | 3/2008 | Proscia et al. |
| 7,540,354 B2 | | 6/2009 | Morin et al. |
| 7,874,142 B2 | | 1/2011 | Beardsley |

(Continued)

FOREIGN PATENT DOCUMENTS

| | | |
|---|---|---|
| FR | 2933224 A1 * | 2/2010 |
| GB | 1516041 | 6/1978 |

(Continued)

OTHER PUBLICATIONS

International Search Report and Written Opinion for International Patent Application No. PCT/US2013/026538 completed May 30, 2013.

(Continued)

*Primary Examiner* — Christopher Verdier

(74) *Attorney, Agent, or Firm* — Carlson, Gaskey & Olds, P.C.

(57) ABSTRACT

An exemplary geared turbomachine assembly includes an acoustic treatment that is in an unducted area of a geared turbomachine.

15 Claims, 3 Drawing Sheets

(56) References Cited

U.S. PATENT DOCUMENTS

| | | | |
|---|---|---|---|
| 2002/0036115 A1* | 3/2002 | Wilson | 181/292 |
| 2007/0034446 A1 | 2/2007 | Proscia et al. | |
| 2007/0251212 A1 | 11/2007 | Tester | |
| 2008/0044280 A1* | 2/2008 | Le Docte et al. | 415/182.1 |
| 2008/0112796 A1 | 5/2008 | Coney et al. | |
| 2009/0045009 A1* | 2/2009 | Chiou et al. | 181/290 |
| 2009/0060704 A1* | 3/2009 | Hurwitz et al. | 415/1 |
| 2009/0191047 A1 | 7/2009 | Schlinker et al. | |
| 2009/0320488 A1 | 12/2009 | Gilson et al. | |
| 2010/0024435 A1* | 2/2010 | Vauchel | 60/797 |
| 2010/0038476 A1* | 2/2010 | Gantie et al. | 244/1 N |
| 2010/0148396 A1 | 6/2010 | Xie et al. | |
| 2010/0331139 A1 | 12/2010 | McCune | |
| 2011/0108357 A1* | 5/2011 | Vauchel | F02K 1/827 |
| | | | 181/222 |
| 2011/0126544 A1 | 6/2011 | Foster | |
| 2011/0167786 A1* | 7/2011 | Marques | F02K 1/386 |
| | | | 60/204 |
| 2013/0111906 A1* | 5/2013 | Bouchard | F02K 1/827 |
| | | | 60/694 |

FOREIGN PATENT DOCUMENTS

| | | |
|---|---|---|
| GB | 2041090 | 9/1980 |
| WO | 2007038674 | 4/2007 |
| WO | 2011157926 | 12/2011 |

OTHER PUBLICATIONS

Search Report and Written Opinion for Singapore Application No. 11201404946.S dated Nov. 23, 2015.

International Preliminary Report on Patentability for PCT Application No. PCT/US2013/026538 dated Sep. 12, 2014.

Extended European Search Report for Application No. 13754057.1 dated Oct. 2, 2015.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

\* cited by examiner

ACOUSTIC TREATMENT IN AN UNDUCTED AREA OF A GEARED TURBOMACHINE

BACKGROUND

This disclosure relates generally to acoustic treatments and, more particularly, to acoustic treatments in an unducted area of a geared turbomachine.

Turbomachines, such as gas turbine engines, typically include a fan section, a turbine section, a compressor section, and a combustor section. Turbomachines may employ a geared architecture that allows the fan to spin at a slower rotational speed than the low pressure turbine.

Air moves into the turbomachine through the fan section. Some of this air moves into a core of the turbomachine. The remaining air moves through a bypass flowpath established between a fan cowl and a core engine cowl of the core. The core of the turbomachine extends axially outside the fan cowl. That is, some of the bypass stream is ducted and some of it is unducted.

Acoustic treatments attenuate noise radiating from the turbomachine. These acoustic treatments are traditionally limited to ducted areas of the turbomachine. Extending acoustic treatments to unducted areas is less efficient as a result of the reduced interaction between the propagating noise and the acoustic treatment surface. Moreover, placing the acoustic treatment in unducted areas subject to high Mach number flows (e.g. near a nozzle exit) results in a performance penalty associated with increased drag. In a typical turbofan with a fan pressure ratio greater than 1.5, the high performance penalty associated with the high nozzle Mach number along with the reduced noise benefit makes it impractical to place acoustic treatment on the unducted area past the fan nozzle exit plane.

SUMMARY

A geared turbomachine assembly according to an exemplary aspect of the present disclosure includes, among other things, an acoustic treatment that is in an unducted area of a geared turbomachine.

In a further non-limiting embodiment of the foregoing geared turbomachine assembly, a portion of the acoustic treatment may be axially aft a fan cowl of the geared turbomachine.

In a further non-limiting embodiment of either of the foregoing geared turbomachine assemblies, a portion of the acoustic treatment is axially aligned with a low-pressure turbine section of the geared turbomachine.

In a further non-limiting embodiment of any of the foregoing geared turbomachine assemblies, the acoustic treatment may extend continuously from the ducted area to the portion that is axially aligned with the low-pressure turbine section of the geared turbomachine.

In a further non-limiting embodiment of any of the foregoing geared turbomachine assemblies, the acoustic treatment may form a portion of a core engine cowl.

In a further non-limiting embodiment of any of the foregoing geared turbomachine assemblies, the acoustic treatment may extend axially to an aftmost end of the core engine cowl.

In a further non-limiting embodiment of any of the foregoing geared turbomachine assemblies, the acoustic treatment may extend continuously from the ducted area to the aftmost end.

In a further non-limiting embodiment of any of the foregoing geared turbomachine assemblies, the acoustic treatment may comprise a perforated face sheet having an open area density that is from 4% to 30%.

In a further non-limiting embodiment of any of the foregoing geared turbomachine assemblies, the acoustic treatment may comprise a microperforated face sheet having apertures with a diameter that is less than 25 percent of the perforated face sheet.

In a further non-limiting embodiment of any of the foregoing geared turbomachine assemblies, the geared turbomachine assembly may have a fan pressure ratio that is less than 1.45 to 1.

A geared turbomachine assembly according to another exemplary aspect of the present disclosure includes, among other things, a fan cowl housing a fan that is driven by a geared architecture, a core cowl housing a core engine, an acoustic treatment establishing a portion of the core cowl aft the fan cowl.

In a further non-limiting embodiment of the foregoing geared turbomachine assembly, the geared turbomachine assembly may have a portion of the acoustic treatment axially aft a fan cowl of the geared turbomachine.

In a further non-limiting embodiment of either of the foregoing geared turbomachine assemblies, a portion of the acoustic treatment may be axially aligned with a low-pressure turbine section of the geared turbomachine.

In a further non-limiting embodiment of any of the foregoing geared turbomachine assemblies, the acoustic treatment may form a portion of the core cowl.

In a further non-limiting embodiment of any of the foregoing geared turbomachine assemblies, the acoustic treatment may extend axially to an aftmost end of the core cowl.

In a further non-limiting embodiment of any of the foregoing geared turbomachine assemblies, the acoustic treatment may comprise a perforated face sheet having an open area density that is from 4% to 30%.

In a further non-limiting embodiment of any of the foregoing geared turbomachine assemblies, the acoustic treatment may comprise a microperforated face sheet having apertures with a diameter that is less than 25 percent of the perforated face sheet In a further non-limiting embodiment of any of the foregoing geared turbomachine assemblies, the geared turbomachine assembly may have a fan pressure ratio that is less than 1.45 to 1.

A method of attenuating noise in a geared turbomachine according to another exemplary aspect of the present disclosure includes, among other things, attenuating noise axially aft of a fan cowl using an acoustic treatment that provides a portion of an engine core, wherein the fan cowl houses a fan driven by a geared architecture.

In a further non-limiting embodiment of the foregoing method of attenuating noise in a geared turbomachine, the acoustic treatment may extend axially past a high-pressure turbine section.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
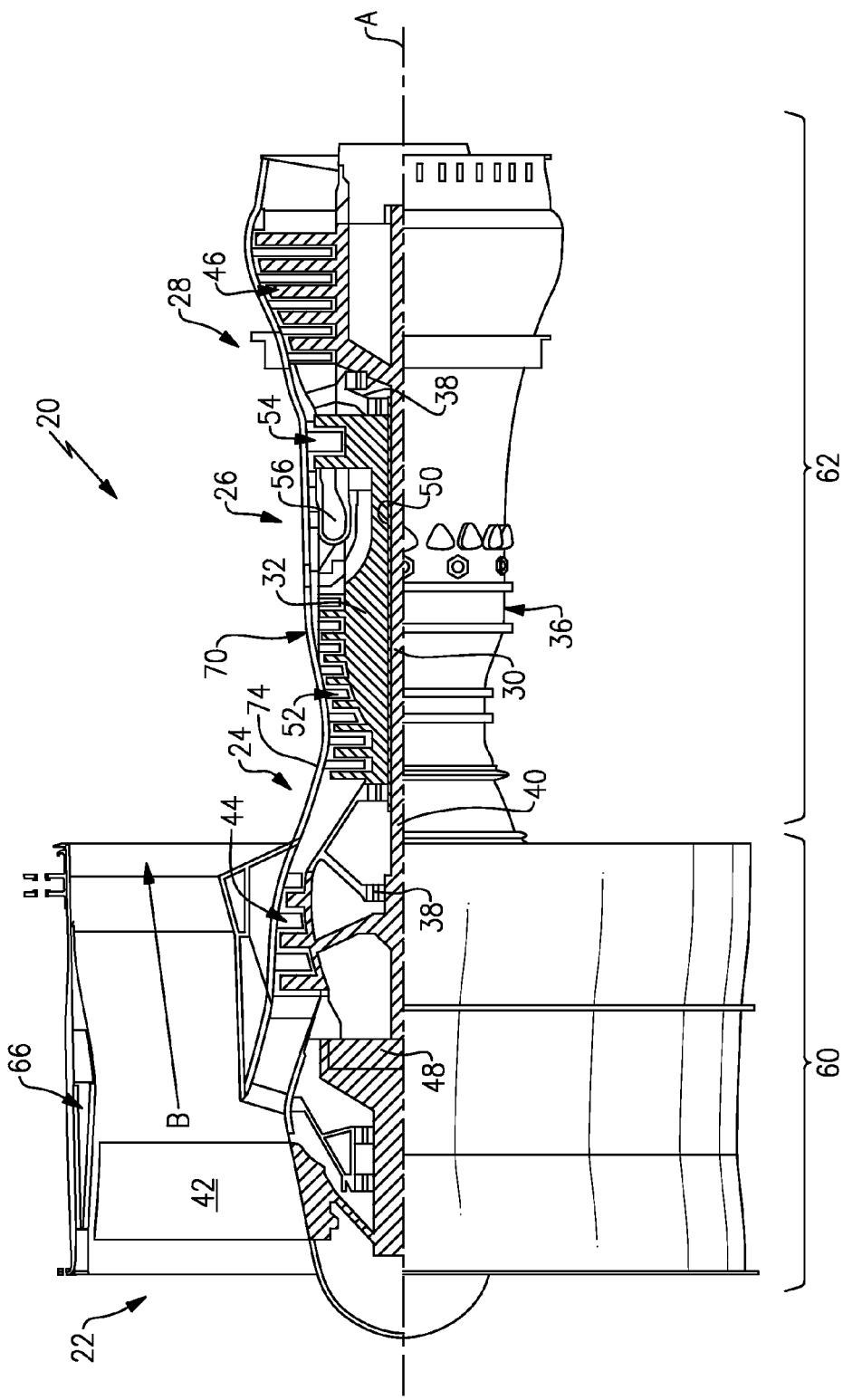
FIG. 1 shows a schematic view of an example turbomachine having a geared architecture.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmentor section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

The example engine 20 generally includes a low-speed spool 30 and a high-speed spool 32 mounted for rotation about an engine central longitudinal axis A relative to an engine static structure 36. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The inner shaft 40 and the outer shaft 50 are concentric and rotate via bearing systems 38 about the engine central longitudinal axis A, which is collinear with the longitudinal axes of the inner shaft 40 and the outer shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio.

The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The Fan Pressure Ratio according to one non-limiting embodiment of the example engine 20 is less than 1.45 (1.45 to 1), which is relatively low.

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

The example gas turbine engine 20 generally includes a ducted area 60 and an unducted area 62. In this example, the ducted area 60 represents the portions of the gas turbine engine 20 axially aligned with, and radially bounded by, a fan cowl 66 (or nacelle). The unducted area represents the portions of the gas turbine engine 20 axially outside of the fan cowl 66.

In this example, a core engine cowl 70 of the gas turbine engine 20 includes portions in the ducted area 60 and portions in the unducted area 62. The core engine cowl 70 includes an acoustic treatment 74 that extends continuously from the ducted area 60 to the unducted area 62. The acoustic treatment 74 is on an outer surface of the core engine cowl 70. That is, at least some of the acoustic treatment 74 is in an unducted area of the gas turbine engine 20.

Figure 2:
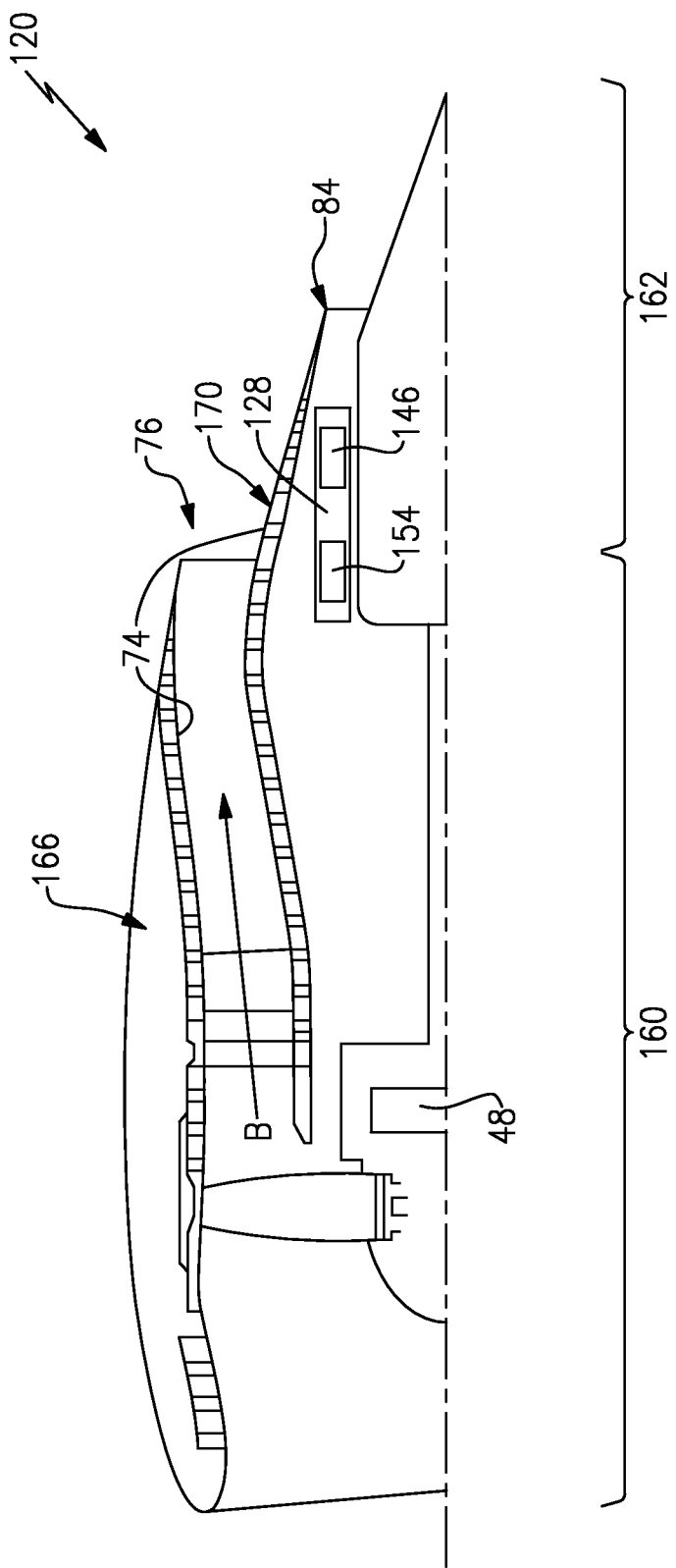
FIG. 2 shows a cross-section view of a portion of another example turbomachine having a geared architecture.

Referring to FIG. 2, another example geared turbomachine is the gas turbine engine 120. In this example, the acoustic treatment 74 extends from the ducted area 160, past an aft end 76 of the fan cowl 166, to the unducted area 162 of the engine 120. Notably, the example acoustic treatment 74 extends continuously, and without interruption, from the ducted area 160 to the aftmost end 84 of the core engine cowl 170.

A portion of the acoustic treatment 74 is axially aligned with the turbine section 128 of the engine 120, and, in particular, the low-pressure turbine 146 within the turbine section 128. The acoustic treatment 74 is continuous and uninterrupted from the ducted area 160, past the high-pressure turbine 154, to the portion that is aligned with the low-pressure turbine 146. In this example, the acoustic treatment 74 also lines radially inwardly facing surfaces of the fan cowl 166.

Figure 3:
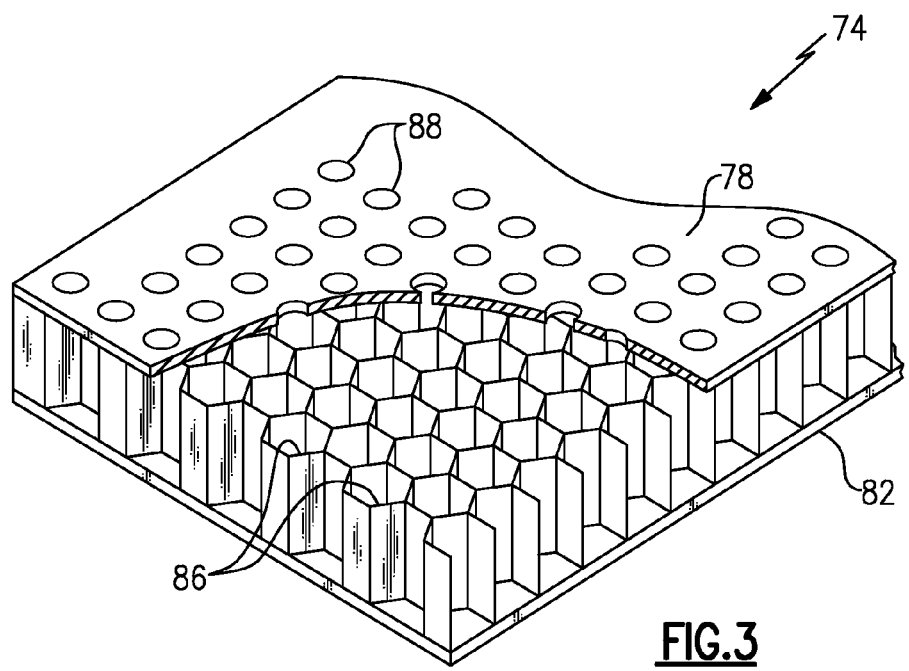
FIG. 3 shows a partial section view of an example acoustic treatment used in the FIG. 2 engine.

Referring to FIG. 3 with continuing reference to FIG. 2, an example acoustic treatment 74 includes a perforated face sheet 78 and a backing sheet 82. A honeycomb structure 86 is sandwiched between the perforated face sheet 78 and the backing sheet 82. The perforated face sheet 78, the backing sheet 82 and the honeycomb structure are all aluminum in this example. Other examples of the acoustic treatment 74 may be made of a composite material or some other material.

The example perforated face sheet 78 includes an array of perforations 88 each having a diameter that is from 0.03 inches (0.762 mm) to 0.06 inches (1.524 mm). A density of the open area in the perforated face sheet 78 is from 6% to 20% in this example. Other perforated face sheets 78 have perforation 88 having other diameters.

In this example, the core engine cowl 170 in the areas of the acoustic treatment 74 is formed entirely by the acoustic treatment 74. That is, there is no walled structure that the acoustic treatment 74 is secured to. The acoustic treatment 74 is at an outer surface of the core engine cowl 170.

In another example, the acoustic treatment 74 and, in particular, the back sheet of the acoustic treatment 74, is adhesively secured to a wall (not shown). In such an example, the adhesively secured acoustic treatment and the wall together form the core engine cowl 170.

Figure 4:
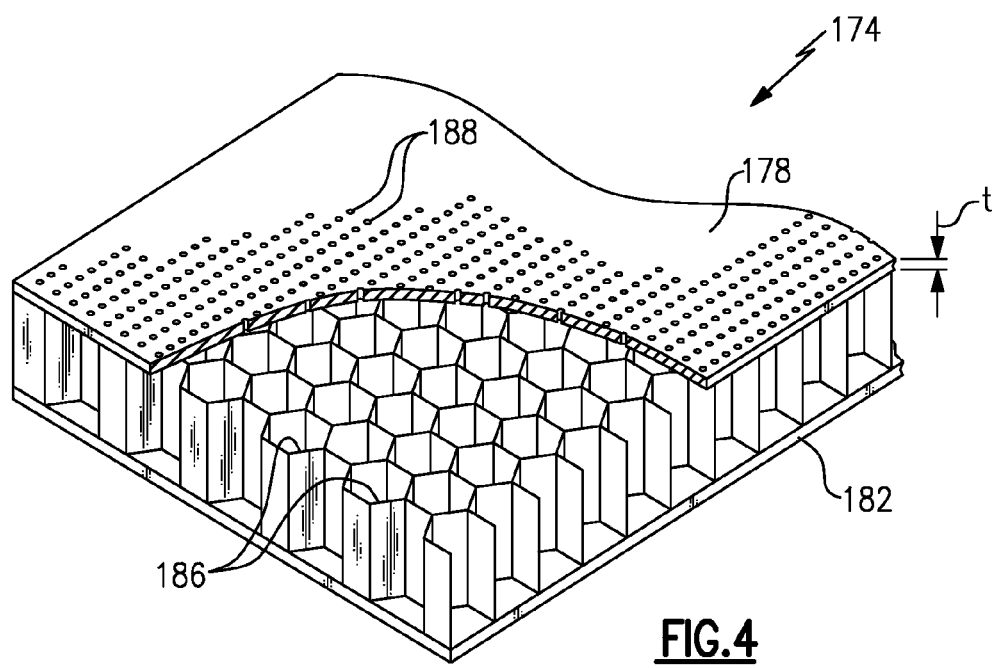
FIG. 4 shows a partial section view of another example acoustic treatment used in the FIG. 2 engine.

The acoustic treatment 74 is a perforated acoustic treatment with a single degree of freedom (SDOF) in this example, other examples may include a Double Degree Of Freedom (DDOF) liner, bulk absorber liner or a microperforated acoustic treatment 174 as shown in FIG. 4. The microperforated acoustic treatment 174 includes a perforated face sheet 178 and a backing sheet 182 sandwiching a honeycomb structure 186. Perforations 188 in the perforated face sheet 178 each have a diameter that is less than 25 percent of a thickness t of the perforated face sheet 178.

Features of the disclosed examples include incorporating an acoustic treatment in an area of a turbomachine that is traditionally not well suited for acoustic treatments due to the associated drag penalties. The added acoustic treatment has minimal impact on fuel burn.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A geared turbomachine assembly, comprising:
an acoustic treatment that is in an unducted area of a geared turbomachine, wherein a portion of the acoustic treatment is axially aligned with a low-pressure turbine section of the geared turbomachine, wherein the acoustic treatment extends continuously from a ducted area to the portion that is axially aligned with the low-pressure turbine section of the geared turbomachine.

2. The geared turbomachine assembly of claim 1, wherein the acoustic treatment forms a portion of a core engine cowl, wherein the acoustic treatment extends axially to an aftmost end of the core engine cowl.

3. The geared turbomachine assembly of claim 2, wherein the acoustic treatment extends continuously from the ducted area to the aftmost end.

4. The geared turbomachine assembly of claim 2, wherein the acoustic treatment forms a portion of the core engine cowl that provides a radially outer boundary of a core flowpath of the geared turbomachine.

5. The geared turbomachine assembly of claim 2, wherein the acoustic treatment forms a portion of the core engine cowl that provides a radially inner boundary of a bypass flowpath of the geared turbomachine.

6. The geared turbomachine assembly of claim 2, wherein the acoustic treatment comprises a perforated face sheet having an open area density that is from 4% to 30%.

7. The geared turbomachine assembly of claim 2, wherein the acoustic treatment comprises a microperforated face sheet having apertures with a diameter that is less than 25 percent of a thickness of the microperforated face sheet.

8. The geared turbomachine assembly of claim 2, wherein the geared turbomachine assembly has a fan pressure ratio less than 1.45.

9. The geared turbomachine assembly of claim 1, wherein the acoustic treatment forms a portion of a core engine cowl that provides a radially outer boundary of a core engine flowpath of the geared turbomachine.

10. The geared turbomachine assembly of claim 1, wherein the acoustic treatment forms a portion of a core engine cowl that provides a radially inner boundary of a bypass flowpath of the geared turbomachine.

11. The geared turbomachine assembly of claim 1, wherein a portion of the acoustic treatment is axially aft a fan cowl of the geared turbomachine.

12. The geared turbomachine assembly of claim 1, wherein the acoustic treatment extends continuously from the ducted area to an aftmost end of a core engine cowl.

13. The geared turbomachine assembly of claim 1, wherein the acoustic treatment comprises a perforated face sheet having an open area density that is from 4% to 30%.

14. The geared turbomachine assembly of claim 1, wherein the acoustic treatment comprises a microperforated face sheet having apertures with a diameter that is less than 25 percent of a thickness of the microperforated face sheet.

15. The geared turbomachine assembly of claim 1, wherein the geared turbomachine assembly has a fan pressure ratio less than 1.45.

\* \* \* \* \*